Inventor
Elmer E. Crane
By Clarence A. O'Brien
Attorney

Patented July 23, 1929.

1,721,545

UNITED STATES PATENT OFFICE.

ELMER ELONZO CRANE, OF LITTLEFIELD, TEXAS.

COTTON HARVESTER.

Application filed May 10, 1927. Serial No. 190,229.

My present invention pertains to cotton harvesting apparatus; and it contemplates the provision of an apparatus adapted to be moved along a row of cotton and to gather cotton bolls as the apparatus is moved, and to deliver the bolls and cotton to a receptacle carried at the rear end of the apparatus.

Incident to the operation of my improved apparatus, the cotton plants are maintained in substantially upright position, and the movement of the toothed apron for stripping bolls and cotton from the plants is rearward and also upward, and the bolls and cotton are stripped from the teeth of the apron as the aprons pass about the rear drums of the apparatus, the bolls and cotton being deposited as before stated in the receptacle at the rear of the apparatus.

Also incident to the use of the apparatus various adjustments may be made so as to enable the apparatus to operate to the best advantage under different conditions.

With the foregoing in mind, the invention in all of its details will be understood from the following description and claim when the same are read in connection with the drawings, accompanying and forming part of this specification, in which:—

Figure 5 is an enlarged detail cross section illustrative of the angle iron longitudinal bars for holding the inner stretches of the toothed apron to their work and against flaring or casually moving outwardly or away from the longitudinal center of the apparatus.

Figure 6 is an enlarged detail view of one of the teeth and the nut for securing the same in its apron.

Similar numerals of reference designate corresponding parts in all the views of the drawing.

Figure 2:
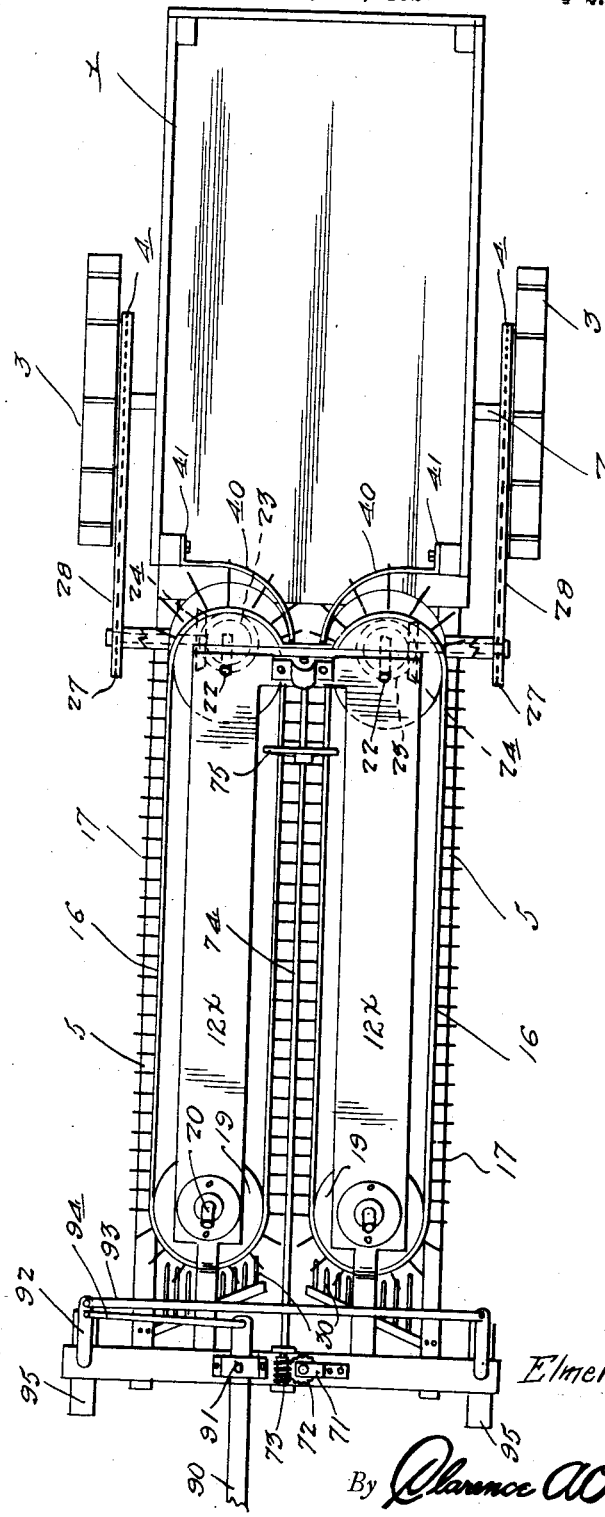
Figure 2 is a top plan view of the same.

Among other elements my novel apparatus comprises a receptacle 1 which is preferably in the form of a vehicle body, as illustrated, and is open at its forward end as best shown in Figure 2. The said receptacle or body 1 is mounted on an axle 2, equipped with ground wheels 3 connected with which are sprocket gears 4.

Figure 3:
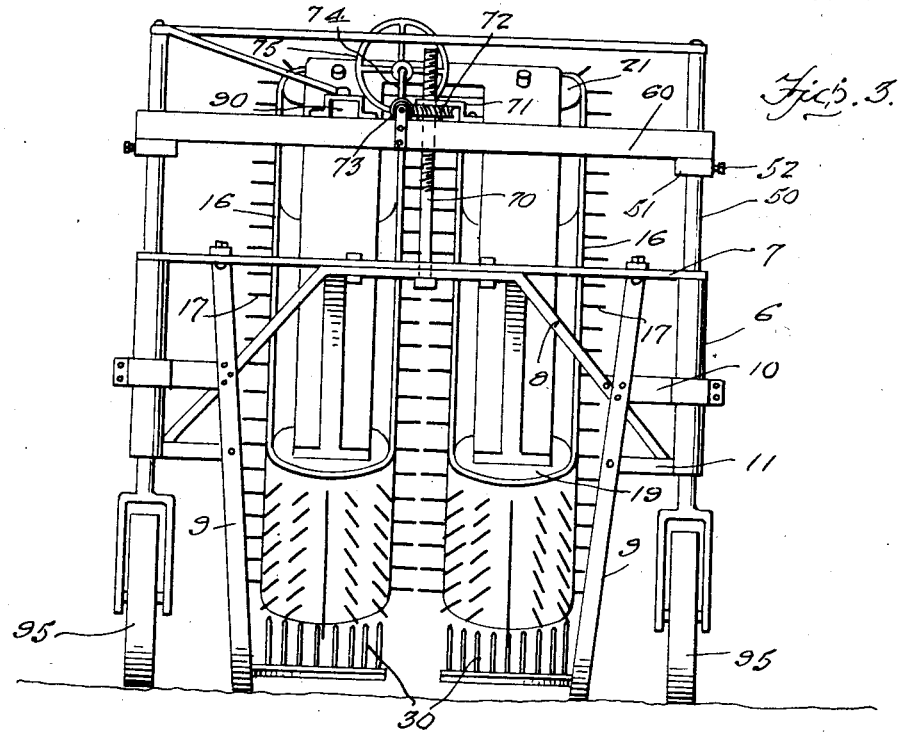
Figure 3 is an enlarged front end elevation of the apparatus.

Appropriately connected with and extending forwardly from the receptacle or body 1 is a frame 5 the forward portion of which is best illustrated in Figure 3. By particular reference to said figure it will be understood that the forward portion of the frame 5 comprises upright tubular portions 6, a crown bar 7 interposed between and connected to the tubular portions 6, a brace member 8 connected with the crown bar and also to the lower portion of the tubular members 6 and pendent bars 9 which are connected to the crown bar 7 and the side portions of the brace 8 and are also connected to arms 10 and 11 on the tubular members 6. At their lower ends the bars 9 are fixedly connected to the lower side-by-side members 12 of the apron frame, the said members 12 being arranged in inclined position, Figure 1, and the rear end portions thereof being fixedly connected to pedestals 13 on the main frame 5. The upper members of the apron frame are designated by 12×, and it will be understood that said members 12× are arranged in parallelism with the lower members 12 and that said members 12 and 12× are spaced apart. Carried on the lower members 12 of the apron frame are the bars 14 for holding the lower edges of the inner stretches of the toothed apron to their work i. e. against undue lateral outward movement. The said bars 14 are of angle cross section, Figure 5, and their upstanding portions are arranged immediately at the outer sides of the inner stretches of the toothed aprons. The outwardly directed portions of the bars 14 are slotted in a direction crosswise of the apparatus, Fig. 5, and the said portions are connected to the members 12 of the apron frame by bolts and nuts as best shown in Figure 5. By virtue of this provision it is to be understood that the bars 14 may be nicely adjusted and may be adjustably fixed at different distances from the longitudinal vertical center of the apparatus so as to enable the apparatus to operate to the best advantage under different conditions.

Two aprons are employed, and the said aprons which are designated by 16 are of endless flexible type. I would also have it understood that each apron is provided with teeth 17, the said teeth being provided with threaded shanks and with heads, and being extended transversely through the material of the aprons 16 so that the heads of the teeth are arranged against the inner sides of the aprons. I would also have it understood that the heads of the teeth 17 are preferably countersunk in the inner sides of the flexible aprons 16, and that the teeth are secured in the apron by nuts 18 which are mounted on the threaded portions of the teeth and are disposed at the outer sides of the aprons 16. From this it follows that when any one of the teeth is impaired, the said tooth may be expeditiously and easily removed, and as readily replaced with a new tooth without disturbing the connection of the other teeth to the apron.

Mounted to turn about their axes between the lower and upper apron members 12 and 13 are the forward drums 19 on which the aprons 16 are mounted and about which said aprons move. The said drums 19 are inclined from the vertical, and it will also be noted that the shafts 20 of said drum are journaled in the forward portion of the sides of the main frame 5. In this connection it will be understood that the said sides of the main frame 5 may be connected appropriately at their forward ends to the before mentioned transverse crown bar 7.

The aprons 16 are also mounted on and passed around rear drums 21. The said drums 21 are inclined from the vertical and are fixed to shafts 22 which are mounted in the pedestals 13 and in the lower and upper frame members 12 and 12× of the apron frame as clearly shown in Figures 1 and 2. At their lower ends the shafts 22 are equipped with mitre gears 23, Figure 4, and the said mitre gears 23 are meshed with upright mitre gears 24 on transverse shafts 25 to which are connected, preferably by clutches 26, sprocket gears 27. These sprocket gears 27 are connected by sprocket chains 28 with the before mentioned sprocket gears 4 and consequently it will be understood that when the apparatus is moved forwardly, the aprons 16 will be driven from the ground wheels 3.

Carried by the lower portions of the before mentioned bars 9 of the main frame 5 are rakes 30 which are inclined inwardly and rearwardly and are so disposed as to move quite close to the ground. It will also be understood from Figures 1, 2 and 3 that the rakes 30 have teeth of different lengths and that the rakes are arranged to rest closely adjacent to the lower end of the perimeters of the forward drums 19. By virtue of the relative arrangement of the rakes 30, the said rakes will serve efficiently in guiding cotton plants into the space between the inner stretches of the aprons 16 and in that way will contribute materially to the efficiency of the apparatus.

Figure 4:
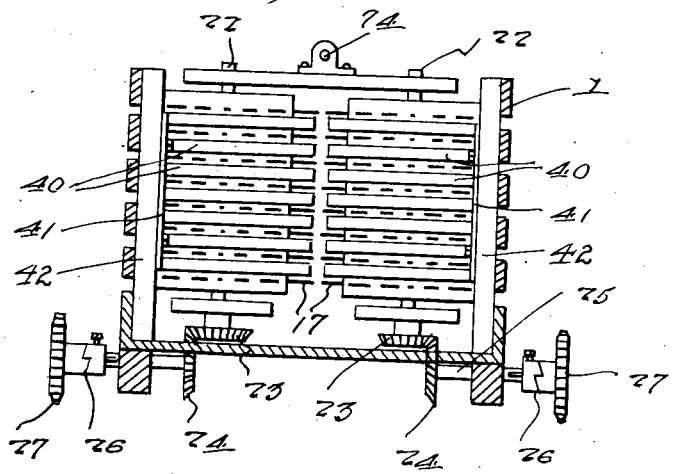
Figure 4 is an enlarged vertical cross section taken in a plane slightly in rear of the stripping blade of the apparatus.

The stripping blades of my novel apparatus are designated by 40 and best shown in Figures 2 and 4 of the drawing. The said stripping blades are spaced apart vertically and are curvilinear in form and are so arranged that their free ends press lightly against the aprons 16 as said aprons pass about the rear drums 21. The stripping blades 40 are also arranged at opposite sides of the paths of the teeth 17, and consequently the stripping blades as their name imports will serve to take cotton bolls and cotton from the teeth 17 as the teeth pass about the drums 21 and will bring about the deposit of the bolls and cotton in the receptacle or body 1.

In the present and preferred embodiment of my invention the stripping blades 40 of each set are integral with a body plate 41, and the said body plate 41 is connected preferably in adjustable manner, to uprights 42 fixed in the receptacle or body 1.

The forward portion of the main frame 5 and the forward portion of the members 12 and 13 of the apron frame are adapted to be adjusted vertically and adjustably fixed so as to position the forward drums 19 and the rakes 30 at different distances above the ground so as to enable the apparatus to operate to the best advantage under different conditions. This adjustable capacity will be better understood when it is stated that spindles 50 extend loosely through the upright tubular portion or members 6 of the main frame 5, and when it is also stated that a bar 60 loosely receives the spindles 50 and is supported on the spindles by collars 51 connected by set screws 52 to the spindles. A screw 70 is connected to and extends upwardly from the beforementioned crown bar 7 and is carried loosely through the bar 60. Mounted on the said screw 70 and confined by a bracket 71 on the bar 60 is a worm gear 72, and meshed with the said worm gear 72 is a worm 73 on a longitudinal shaft 74, suitably supported at its rear end and equipped at 75 with a hand wheel. Manifestly when the shaft 74 is turned in one direction, the forward portion of the main frame 5 will be raised, while when said shaft 74 is turned in the opposite direction, the forward portion of the main frame 5 will be depressed; and it will also be appreciated that by virtue of the character of the adjusting means the forward portion of the main frame 5 will be retained in the position in which it is placed.

Figure 1:
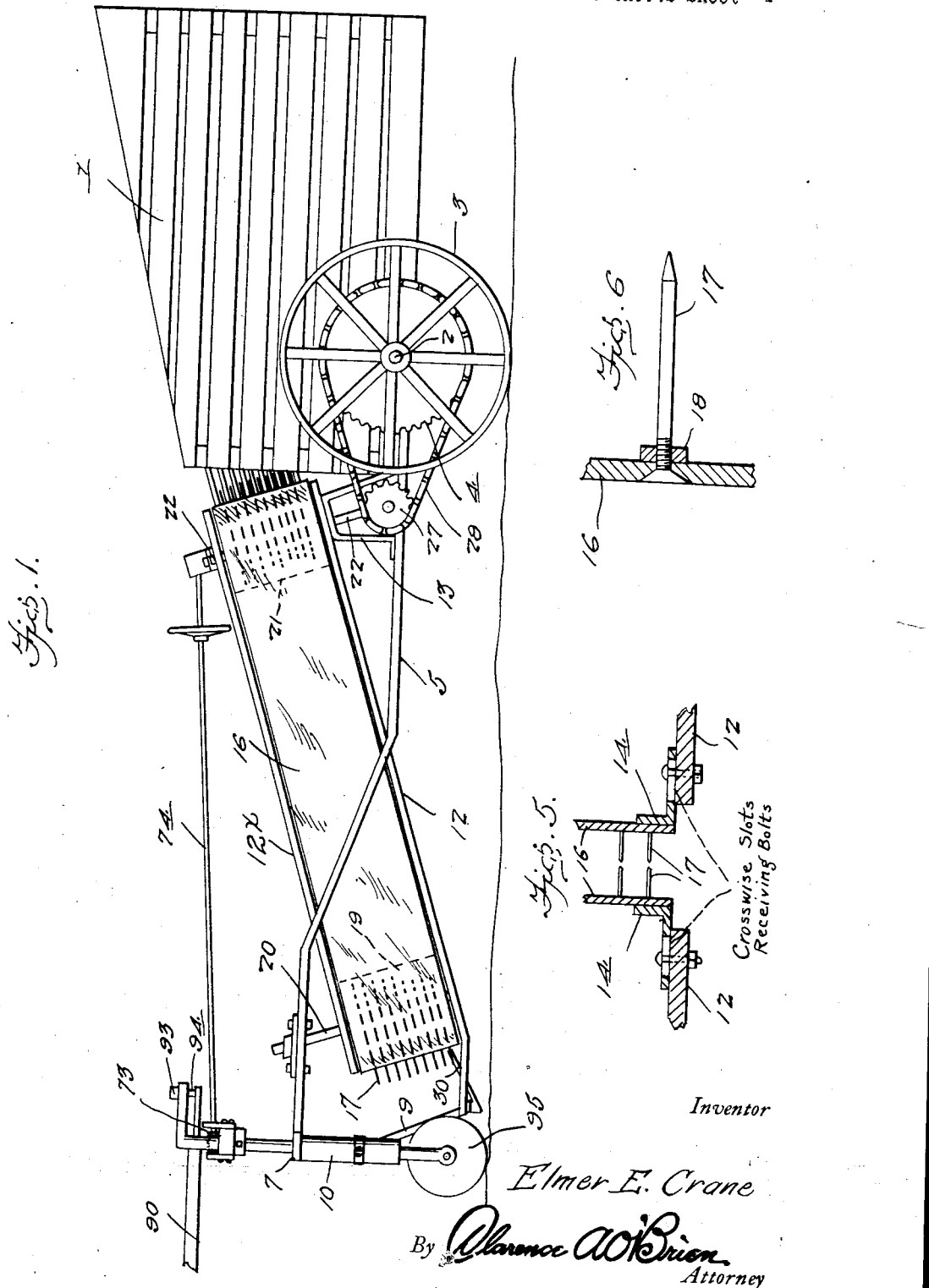
Figure 1 is a side elevation of the cotton harvester constituting the preferred embodiment of my invention.

It will be readily appreciated from the foregoing that the drums 21 are higher than the drums 19 in about the proportion illustrated in Figure 1, and that therefore the aprons 16 are generally inclined downwardly and forwardly. From this it follows that in operation, the cotton plants will be held in substantially upright positions between the inner stretches of the aprons 16, and the aprons being driven, the teeth will strip the plant of bolls and cotton in an upward and rearward direction so that practically no cotton will be left on the plant. Again it will be understood that incident to the forward movement of the harvester with the aprons 16 at opposite sides of a row of cotton plants, the rakes will assist materially in guiding the plants between the inner stretches of the aprons. While between the rearwardly moving inward or inner stretches of the aprons 16 the plants will become entangled between the teeth 17, and the said teeth will operate efficiently to strip the plants of bolls and cotton, and the bolls and cotton will be carried rearwardly on the teeth until the stripping blades are reached, whereupon said stripping blades 40 will operate incident to the movement of the aprons to strip the bolls and cotton from the teeth and bring about the deposit of the burrs and cotton in the receptacle 1.

My novel cotton harvesting apparatus is designed to be drawn along the row of cotton plants by draft animals moving at opposite sides of the said row of plants, and toward the said end I provide the bar 60 with a tongue or pole 90 pivotally connected at 91 thereto, and in order to facilitate the guiding of the apparatus I provide the spindles 50 at their upper ends with cranks 92 connected together by a cross bar 93. I also interpose a link rod 94 between one of the cranks 92 and the rear arm of the lever-like tongue or pole 90, and consequently it will be seen that when the tongue or pole 90 is swung or moved horizontally, ground wheels 95 carried at the lower ends of the spindles 50 will be correspondingly moved.

Having thus described the invention, what I claim is:—

A cotton harvester comprising a receptacle open at its forward end, ground wheels supporting said receptacle, a main frame connected with and extending forwardly from said receptacle, wheeled means supporting the forward portion of the main frame, an apron frame carried by the main frame and inclined longitudinally downwardly and forwardly, forward drums mounted in the apron frame, rear drums also mounted in the apron frame and disposed in a plane above that of the forward drums, driving connections between the first named ground wheels and the rear drums for driving the latter by the former, endless toothed aprons mounted and movable on the drums, rakes disposed in front of the forward drums and adapted to assist in guiding cotton plants to the space between the inner stretches of the aprons, and means for stripping bolls and cotton from the teeth on the aprons as said aprons pass about the rear drums and bring about the deposit of the bolls and cotton in the said receptacle; the said stripping means comprising curvilinear spaced blades with their free ends closely adjacent to the apron as the latter pass about the rear drums, and body plates carrying the curvilinear blades and connected to upright portions of the receptacle.

In testimony whereof I affix my signature.

ELMER ELONZO CRANE.